Patented Jan. 15, 1946

2,393,067

UNITED STATES PATENT OFFICE 2,393,067

STEROID DERIVATIVES

Hans R. Rosenberg, Wilmington, Del., and Daniel H. Terry, Woodstown, N. J., assignors to E. I. du Pont de Nemours & Company, Wilmington, Del., a corporation of Delaware No Drawing. Application July 2, 1942,
Serial No. 449,517

2 Claims. (Cl. 260—397.2)

This invention relates to a new class of steroid derivatives and processes for their production and use.

Numerous steroid derivatives are known in the art. Likewise, many of these derivatives have been isolated and identified, and processes for their production have been discovered. Because of the complexity of their molecules and the numerous by-products which may be formed therefrom it is particularly important that new and stable derivatives thereof be produced. In this manner, valuable steroids may be isolated, stored and/or converted to important pharmaceutical and chemical products with a minimum of deleterious side reactions taking place.

It is an object of this invention to produce a new class of steroid derivatives which are capable of conversion to important pharmaceutical and chemical products. A further object is to produce a new class of pharmaceutical intermediates. A still further object is to produce derivatives of 7-hydroxy sterols which are of particular value in the production of pro-vitamins D. Additional objects will become apparent from a consideration of the following description and claims.

These objects are attained according to the hereinafter described invention which comprises the production of polycarboxylic acid esters of steroids, and the employment of such esters in the further production of pharmaceuticals and chemicals. In a more restricted sense this invention is concerned with polycarboxylic acid esters of steroids having a double bond adjacent at least one of said polycarboxylic acid ester groups. In a still more restricted sense this invention is concerned with polycarboxylic acid esters of 7-hydroxy sterols, and in particular 7-hydroxy-cholesterol. In its preferred embodiment this invention pertains to the production of 7-hydroxy-cholesterol-7-acid-phthalate-3-benzoate and 7-hydroxy cholesterol-7-acid-succinate-3-benzoate, and the employment of such esters in the production of 7-dehydro-cholesterol.

The invention may be more readily understood by a consideration of the following illustrative examples wherein the quantities are stated in parts by weight.

Example 1

Five parts of 7-hydroxy-cholesterol-3-benzoate, M. P. 192–193° C. (described by Rosenberg and Tinker, U. S. P. 2,215,727) and 12 parts of phthalic anhydride are dissolved in 25 parts of pyridine and the mixture is refluxed for one hour. (Temp. 114–118° C.) The pyridine solution is poured into water, extracted with ether and the ether solution extracted with dilute sulfuric acid, sodium carbonate and water. After drying the ether solution over anhydrous sodium sulfate, the ether is distilled off. The residue is recrystallized repeatedly from acetone-methanol mixture and 7-hydroxy-cholesterol-7-acid phthalate-3 - benzoate, melting point about 187–187.5° C. (uncorr.) is obtained. Calculated for $C_{42}H_{54}O_6$; $C=77.11$; $H=8.32$; found $C=77.05$; $H=8.32$.

Example 2

One part of 7-hydroxy-cholesterol - 7 - acid phthalate-3-benzoate, M. P. 187–187.5° C. is dissolved in twenty parts of terpineol and the mixture refluxed for three hours. (Temp. 216–220° C). The terpineol is then distilled off under reduced pressure (3 mm.) and acetone is added to the residue. The 7-dehydro-cholesterol-benzoate crystallizes out in a yield of 65% of theory and by saponification is converted into 7-dehydro-cholesterol.

Example 3

One part of 7-hydroxy-cholesterol - 7 - acid phthalate-3-benzoate is dissolved in ten parts of "Tetralin." The mixture is refluxed under nitrogen for two hours. The mixture is cooled to about 50–60° C. and the "Tetralin" is distilled over under vacuum and the reaction product is worked up as described in the above example. A 50% yield of 7-dehydro-cholesterol benzoate is obtained.

Example 4

7-hydroxy-cholesterol-7-acid phthalate - 3 - benzoate is dissolved in dimethyl aniline in a molecular ratio of 1:100. The mixture is refluxed under nitrogen for two hours, and the reaction product is worked up as described in the previous paragraphs. A yield of 60% of theory of 7-dehydro-cholesterol benzoate is obtained.

Example 5

Five parts of 7-hydroxy-cholesterol-3-benzoate, M. P. 192–193° C. and 5 parts of succinic anhydride are dissolved in 50 parts of pyridine, and the mixture is refluxed for one hour. (Temp. 114–118° C.) The pyridine solution is poured into water, extracted with ether and the ether solution extracted with dilute sulfuric acid, sodium carbonate, and water. The sodium carbonate extract and water washes are combined, neutralized with dilute hydrochloric acid, and extracted with ether. The ether extract was washed a number of times with water to remove excess succinic acid, dried over anhydrous sodium sulfate, and concentrated to dryness. The residue is recrystallized from methanol repeatedly and 7-hydroxy-cholesterol-7-acid succinate-3-benzoate which melts at about 178–179° C. (uncorr.) is obtained. Calculated for $C_{38}H_{54}O_6$: $C=75.02$; $H=8.91$; found for $C=74.70$; $H=8.69$.

Example 6

One part of 7-hydroxy-cholesterol-7-acid succinate-3-benzoate, M. P. 178–179° C. is dissolved in 20 parts of terpineol and the mixture is refluxed for three hours. (Tem. 216–220° C.) The mixture is cooled to about 50–60° C. and the terpineol is distilled over under vacuum. Acetone is added to the residue and the 7-dehydro-cholesterol benzoate is isolated in a yield of 65% of theory. The product is converted by saponification to 7-dehydro-cholesterol.

Example 7

One part of 7-hydroxy-cholesterol-7-acid succinate-3-benzoate is dissolved in 50 parts of "Tetralin." The mixture is refluxed under nitrogen for two hours. The mixture is cooled to about 50–60° C. and the "Tetralin" is distilled over under vacuum. The reaction product is worked up as described in the above example. A 50% yield of 7-dehydro-cholesterol benzoate is obtained.

Example 8

7-hydroxy-cholesterol-7-acid succinate-3-benzoate is dissolved in dimethyl aniline in a molecular ratio of 1:100. The mixture is refluxed under nitrogen for two hours, and the reaction product is worked up as described in the previous paragraphs. A yield of 45% of theory of 7-dehydro-cholesterol benzoate is obtained.

Example 9

Equimolecular amounts of 7-hydroxy-cholesterol-7-acid succinate-3-benzoate and sodium acetate are mixed together and heated under nitrogen at 200° C. for two hours. The mixture is drowned in water, extracted with ether and the ether solution extracted with sodium carbonate and water. After drying the ether solution over anhydrous sodium sulfate, the ether is distilled off. Acetone is added to the residue and the 7-dehydro-cholesterol-benzoate crystallizes out in a yield of 37% of theory.

It is to be understood that the foregoing examples are representative merely of a few of the many embodiments of this invention. They may be varied widely both with respect to the individual reactants, the amounts thereof, and the conditions of reaction without departing from the scope of this invention.

In place of the steroids previously referred to it is to be understood that the numerous other steroids which occur in nature or which are derivable therefrom are contemplated for use herein. In particular, it is to be understood that this invention embraces the treatment of those steroids wherein a double bond exists in a position adjacent to the hydroxy group, especially when this hydroxy group occurs in the 7-position. This is so regardless of whether additional substituents are also present in other positions of the molecule.

Any compound may be treated in accordance with this invention which has a cyclo-pentano-perhydro-phenanthrene skeleton wherein the hydroxy group is in the 7-position and a double bond is in the 5,6-position. Such substances are sometimes termed steroids or sterid compounds, and include those having the nucleus previously referred to with or without side chains. It likewise includes those compounds wherein the side chains are substituted with other functional groups, such as, for example, oxo, hydroxyl and carboxyl groups, as well as their derivatives. It is, therefore, to be understood that the term "steroids" includes not ony sterols, but also bile acids, plant heart poisons, saponines and sex hormones.

A representative few of the many steroids included within the scope of the foregoing are 7-hydroxy-cholesterol, 7-hydroxy-sitosterol, 7-hydroxy-stigmasterol, 3,7-dihydroxy-delta-5-cholenic acid, delta-5-3,7,17-androstentriol, and the corresponding compounds of the pregnane series.

As previously mentioned, these compounds are esterified with a polycarboxylic acid. Examples of a few of such acids are oxalic, succinic, adipic, fumaric, maleic, glutaric, pimelic, 3-nitro-phthalic, 4-chlorophthalic, 4-methoxy-phthalic, suberic, mesaconic, aconitic, trimesic, prehnitic, etc.

It should be noted that mixtures of steroids and/or esterifying agents may be used without departing from the scope of this invention. For certain purposes such mixtures may produce esters which are superior to those produced from single reactants.

In the preferred embodiment of the invention the aforesaid polycarboxylic acids are reacted with the hydroxyl group on the 7-position of a sterol molecule, particularly wtih 7-hydroxy-cholesterol. It is also contemplated that in addition to, or in place of, the foregoing hydroxyl group they may be reacted with other hydroxyl groups present on the molecule. Likewise, it is contemplated that the remaining hydroxyl groups of the molecule may be esterified with the same or other acids, which may be monocarboxylic or polycarboxylic, before the hydroxyl group on the 7-position is esterified. This latter hydroxyl group is then esterified with the polycarboxylic acids previously mentioned or with acids suggested thereby.

Esterification of the steroid with the polycarboxylic acid may be accomplished in accordance with well known esterification technique. For example, the steroid may be treated with the chloride or anhydride of the polycarboxylic acid. This is preferably carried out in the presence of an acid-binding agent such as an amine.

The resulting esterified steroid may be then treated to introduce therein a double bond. This is particularly desirable in the case of 7-hydroxy sterol esters since the resulting product may then be made antirachitically active by suitable treatment. Introduction of this double bond may be effectuated by selective thermal decomposition of the esterified steroid, either in the liquid or solid phase.

This thermal decomposition is preferably carried out in the liquid phase in the presence of solvents and assisting agents, a few of which have been referred to in the above examples. Additional solvents and assisting agents may, of course, be added thereto or substituted in place thereof without departing from the scope of the invention. The solvents and assisting agents are of particular value where it is sought to introduce a double bond in the 7—8 position by splitting out an acid from an esterified 7-hydroxy sterol compound. Some of the solvents and assisting agents satisfactory for use in this connection are hydrocarbons, alcohols, ketones, esters, amines, nitriles and the like. A representative group of them are disclosed in U. S. Patents No. 2,209,934 and 2,255,815; and in U. S. Patent applications Serial No. 426,785, 431,315 and 439,241.

Where the aforementioned thermal decomposition reaction is carried out in the solid phase there is an absence of any solvent. The presence of solid assisting agents is, however, contemplated although they are not essential.

By applying the foregoing selective thermal decomposition reaction to polycarboxylic acid esters of 7-hydroxy sterols valuable 7-dehydro sterols may be obtained. If the so-obtained products contain additional ester groups they may be removed by suitable and well known saponification treatments to produce the unesterified 7-dehydro sterols. This treatment is particularly adaptable to the production of 7-dehydro cholesterol, which is of great commercial importance because it may be antirachitically activated to produce a valuable and essential vitamin D.

By means of the present invention a new class of chemical and pharmaceutical intermediates is rendered available. These compounds are quite dissimilar to any heretofore known and are of particular value in the production of certain pharmaceuticals, particularly provitamins D. The compounds are easy to produce and they are admirably adapted to the introduction of double bonds therein.

As many apparently widely different embodiments of this invention may be made without departing from the spirit and scope thereof, it is to be understood that the invention is not limited to the specific embodiments thereof except as defined in the appended claims.

We claim:
1. 7-hydroxy-cholesterol-7-acid phthalate-3-benzoate.
2. A process which comprises esterifying 7-hydroxy-cholesterol-3-benzoate with phthalic anhydride.

HANS R. ROSENBERG.
DANIEL H. TERRY.